US005681990A

United States Patent [19]

Hampo et al.

[11] Patent Number: 5,681,990
[45] Date of Patent: Oct. 28, 1997

[54] CAPACITIVE THROTTLE POSITION SENSOR

[75] Inventors: Richard Joseph Hampo, Livonia; David Lee Striker, Plymouth, both of Mich.; William Henry Lee, Watsonville; Michael John Lee, Carmel, both of Calif.

[73] Assignee: Ford Motor Company, Dearborn, Mich.

[21] Appl. No.: 568,923

[22] Filed: Dec. 7, 1995

[51] Int. Cl.[6] .................. G01M 15/00; G08C 9/02; G08C 19/10
[52] U.S. Cl. .................. 73/118.2; 73/118.1; 324/683
[58] Field of Search .................. 73/116, 117.2, 73/117.3, 118.1, 118.2, 202.5, 204.11, 204.14, 204.17, 204.22; 324/658, 663, 671, 672, 674, 683; 340/439

[56] References Cited

U.S. PATENT DOCUMENTS

| | | | |
|---|---|---|---|
| 3,198,937 | 8/1965 | Wooster | 235/154 |
| 3,487,402 | 12/1969 | Hillhouse | 324/683 |
| 3,717,869 | 2/1973 | Batz | 340/347 |
| 3,961,318 | 6/1976 | Farrand et al. | 340/200 |
| 4,092,579 | 5/1978 | Weit | 318/662 |
| 4,199,800 | 4/1980 | Weit | 361/239 |
| 4,238,781 | 12/1980 | Vercellotti et al. | 324/683 |
| 4,339,709 | 7/1982 | Brihier | 324/61 |
| 4,404,560 | 9/1983 | Williams | 324/683 |
| 4,429,308 | 1/1984 | Shankle | 324/683 |
| 4,433,332 | 2/1984 | Wason | 324/683 |
| 4,477,810 | 10/1984 | Tanaka et al. | 340/870.37 |
| 4,788,546 | 11/1988 | Sasaki | 324/683 |
| 4,879,552 | 11/1989 | Arai et al. | 340/870.37 |
| 5,012,673 | 5/1991 | Takano et al. | 73/118.1 |
| 5,075,631 | 12/1991 | Patriquin | 324/671 |
| 5,204,674 | 4/1993 | Holben | 324/683 |
| 5,315,865 | 5/1994 | Hornfeck et al. | 73/118.1 |

FOREIGN PATENT DOCUMENTS 0118435  7/1930  Austria ................. 324/683

Primary Examiner—George M. Dombroske
Attorney, Agent, or Firm—Gregory P. Brown; Roger L. May

[57] ABSTRACT

A capacitive throttle position sensor includes an electrode board having at least three electrodes, a driver for selectively driving the electrodes, and a rotary member including a dielectric that provides capacitive path to an output electrode. Preferably, a logical driver provides incrementally sequenced charges to the driver electrodes. The output electrode is coupled to a signal processor that prepares the signal for comparison in a logical decoder with respect to an initiating driver electrode signal. Preferably, the phase difference between the output and input of the capacitive sensor provides an output signal which is not dependent upon the absolute capacitance of the element, and thus provides an output signal which can be adapted to a number of formats for motor vehicle control. Both two piece and three piece versions of the stationary and rotary parts are disclosed, and the capacitive gap may be axially or radially aligned between the stationary and rotary components.

17 Claims, 4 Drawing Sheets

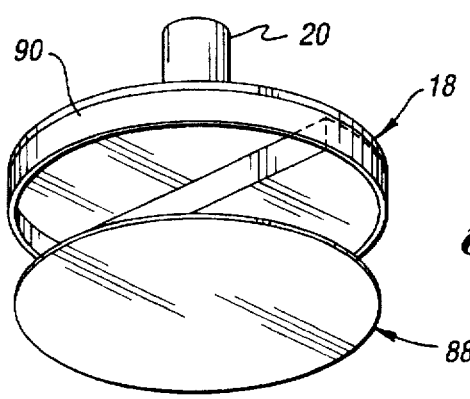
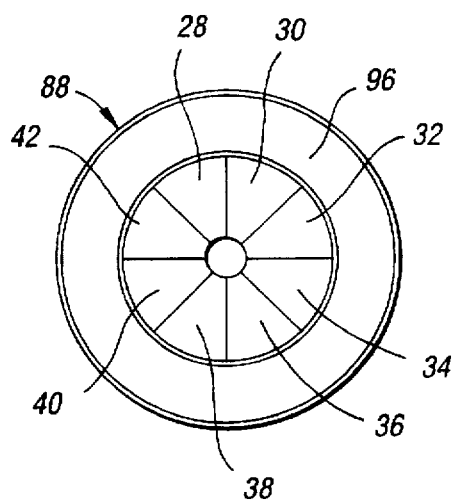
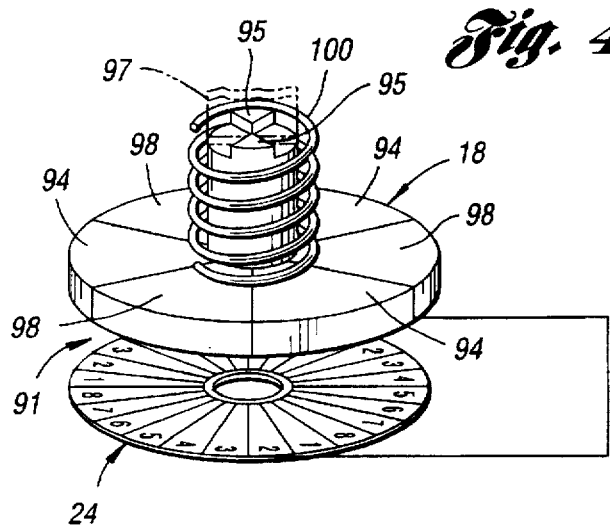
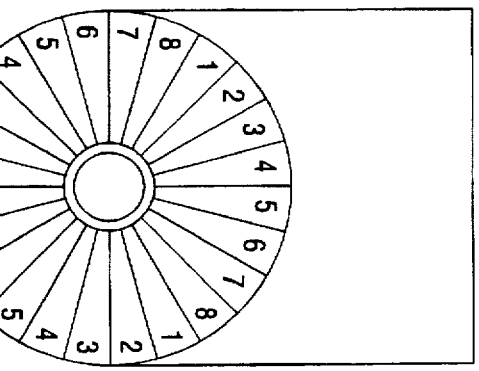
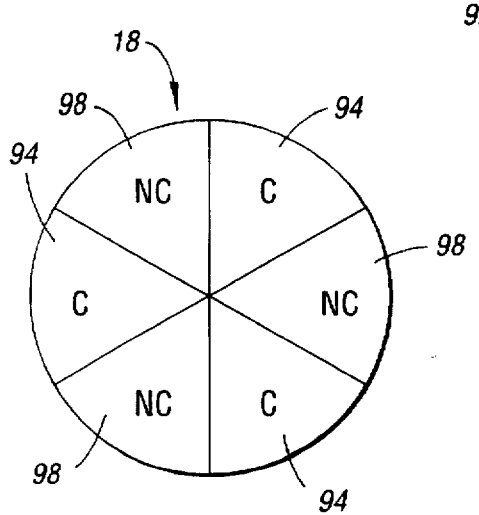

CAPACITIVE THROTTLE POSITION SENSOR

TECHNICAL FIELD

The present invention relates generally to non-contact throttle position sensors, and more particularly to a capacitive sensor with a driver that provides a relative rather than absolute changes in capacitance as a function of throttle position.

BACKGROUND ART

The movement of the throttle valve in a motor vehicle engine is responsive to the demand of the motor vehicle operator. Preferably, the air/fuel mixture is controlled in response to the throttle position, and numerous sensors for generating a control signal in response to the throttle position have been developed. However, many previously known sensors are contact sensors in which the mechanical movement of the throttle is traced by mechanical displacement of electrical conductors in order to electrically represent the change in throttle positions. Such sensors are subject to mechanical wear that can substantially affect the efficiency and longevity of the electrical conductors and other moving components. Moreover, inherent electrical noise in the output signal limits resolution to a relatively large increment of angular displacement.

An alternative form of sensors are generally referred to as non-contact sensors, but such sensors were not previously well adapted for use in throttle position sensing. For example, previously known capacitive non-contact sensors often rely on changes in the absolute capacitance between two electrodes to generate the control signal responsive to throttle position. However, the absolute value of capacitance can be affected by environmental conditions such as the variations in temperature, moisture, debris vibration and other factors to which a moving vehicle is subjected. As a result, the accuracy of the sensor decreases as the age and use of the vehicle increases. Moreover, some previously known capacitive resolvers are limited to discrete increment segments of movement within a particular range. Other types of non-contacting sensors such as Hall effect transducers substantially increase the cost or complexity of the sensing apparatus and signal processing for necessary outputs.

SUMMARY OF THE INVENTION

The present invention overcomes the above mentioned disadvantages by providing a simple non-contact throttle position sensor using capacitive sensing means with a logic control for driving the sensor in a manner that relies upon relative changes rather than an absolute value of capacitance throughout operation of the sensor. In general, a driver electrode board including a plurality of electrodes is aligned adjacent a rotating member with a coupler for rotational movement with a throttle shaft. An intermediate dielectric having a spatially non-uniform conductive dimension between the driving board and the rotating member provides the relatively changing capacitance between the driver electrode board to an output electrode associated with the rotating member. The association between the electrode and the dielectric only requires that the signal path is confined to pass through the dielectric to the electrode regardless of whether the dielectric and electrode are physically united or separated at a gap. A logical driver coupled to the electrode board develops an input to the sensor body that is output from the output electrode and delivered to a signal processor for generating a phase responsive signal. A logical decoder generates a sensor output representing throttle angular position independent of absolute capacitance between the electrodes.

The present invention represents a ready substitute for existing throttle position sensor technology in that it readily provides an output for use in conjunction with operation of the vehicle. For example, the output may be used to control the air/fuel mixture being delivered to the engine in direct response to an analog signal generated by the sensor. In addition, pulse width modulated signals may also be delivered in order to control electronic motor control modules or the like. Another output in distal form may also be generated to enhance additional signal processing or vehicle control.

In the preferred embodiment, the logic driver generates a plurality of driving signals for driving a plurality of electrode segments. In one embodiment, eight segments are driven in incrementally sequenced portions. For example, segments 1–4 may be high while segments 5–8 are low. At the next time interval, the pattern is shifted to charge electrode segments 2, 3, 4 and 5 while 6, 7, 8 and 1 will remain low. The pattern continues, the rotating logic field set up between the electrode driver board and the output sensing board rotating, preferably at a high rate, as the signal-to-noise ratio improves with increasing frequency, and its limits depend upon how high of an oscillator speed is conveniently available. The initiating driving signal or input edge is generated when any one pattern, for example, 1, 2, 3, 4 high (repeats). Each sequence of pattern repetition can be called a scan.

Preferably, the driver provides digital excitation of the sensor, and the output of the phase detecting circuit is digital while the angular position is preferably output by an analog signal that conforms with conventional outputs that would be generated by previously known contact sensors conventionally used. A pulse width modulated (PWM) signal, preferably fed through a low pass filter to obtain the analog signal, may be used to provide the analog signal. Alternatively, the pulse width modulated signal may be utilized as compatible with an electronic control module or other apparatus. In addition, digital output may be obtained, for example by a ten bit digital output encoder created by digital logic.

Thus the present invention provides a non-contact sensing arrangement without physical wear of the conductive path and that is less affected by environmental phenomena than with previously known throttle position sensors. As a result, contaminants such as water vapor frost, oil and temperature changes interfere substantially less than previously known throttle position sensors. The present invention also provides a capacitive throttle position sensor whose output can be made compatible with the type of an engine controller thought to be used to provide the proper air/fuel ratio to the cylinders.

BRIEF DESCRIPTION OF THE DRAWING

The present invention will be more clearly understood by reference to the following detailed description of a preferred embodiment, when read in conjunction with the accompanying drawing in which like reference characters refer to like parts throughout the views and in which:

FIG. 3 is a perspective view of a modified sensor constructed for use in a system as shown in FIG. 1;

FIG. 4 is a plan view of a portion of the apparatus shown in FIG. 3;

FIG. 5 is a further modification of the sensor apparatus for use in a throttle position sensor system shown in FIG. 1;

FIG. 6 is a plan view of a portion of the apparatus as shown in FIG. 5;

FIG. 7 is a plan view of another portion of the apparatus shown in FIG. 5; and

DETAILED DESCRIPTION OF A PREFERRED EMBODIMENT

Figure 1:
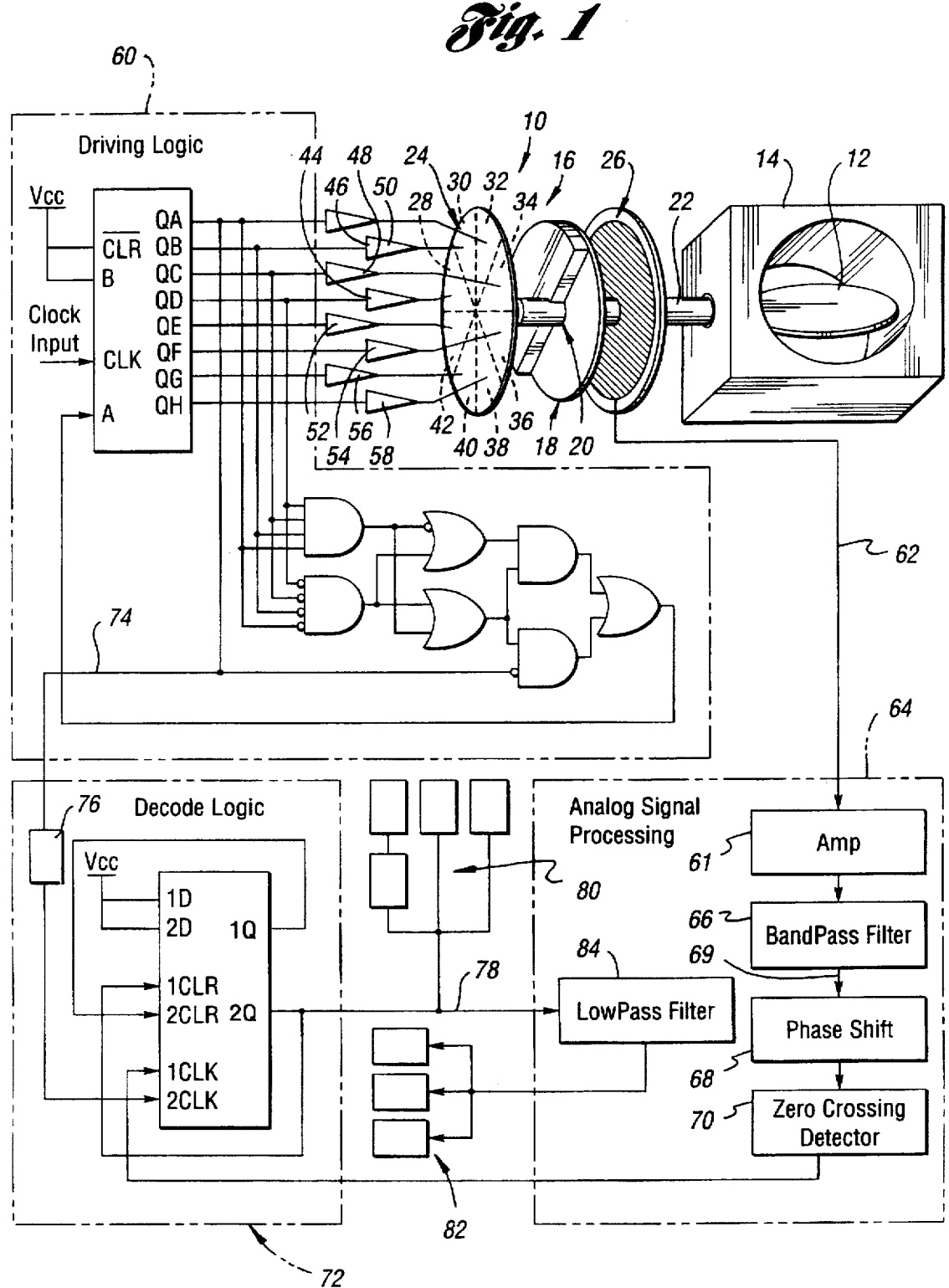
FIG. 1 is a schematic and diagrammatic perspective view of a throttle position sensor constructed according to the present invention.

Referring first to FIG. 1, the throttle position sensor 10 is associated with a throttle valve of a motor vehicle power train indicated diagrammatically at valve body 14. Although the sensor 10 is particularly well adapted for accurate representation of the position of the butterfly throttle valve 12 with respect to the throttle body 14, the sensor is particularly well adapted for accurate representation of the valve position throughout the conventionally limited range of displacement of the valve 12, for example, throughout a 120° pivotal displacement. Nevertheless, the sensor 10 is also applicable to similar mechanical movements of other devices.

The sensor 10 includes a sensor body 16 having at least one rotary element 18 including a coupler 20 for rotary movement with the pivoting valve 12. In the embodiment shown in FIG. 1, the coupler 20 comprises a direct connection of the rotary element 18 to a shaft 22 rotatable with movement of the valve 12, although the coupler is to be understood as referring to any connection with any element moved in corresponding relation to the valve position. The shaft 22 may be any shaft associated with movement of the valve in the valve body 14.

Still referring to FIG. 1, the rotary member 18 is formed of a dielectric material having a non-uniform spacial dimension between a driver electrode board 24 and an output electrode 26. The driver electrode board 24 of FIG. 1 includes eight pie segment electrodes 28-42. Each segment is coupled with a charging terminal 44-58 of a microchip used in the formation of a logical driver 60. Regardless of the particular implementation of logical driver 60, the driver includes a programmed chip or circuitry otherwise designed to provide a predetermined selection of pulses to the electrodes 28-42 from the terminals 44-58. In the preferred embodiment, four adjacent electrodes, for example 28, 30, 32 and 34 are charged at the initiation of a scan. At the next clock pulse, the set of electrodes is incremented by one so that terminals apply a signal to electrodes 30, 32, 34 and 36. The incremented sequencing of signals applied to the electrodes continues until a full cycle called a scan has been completed. The cycle is repeated with the continuing pattern at a high rate, for example, a 30 kHz rate selected for ease of component selection and availability in implementing the band pass filter.

Signal processing of the output signal 62 is provided by an analog signal processor 64. In the preferred embodiment, the processor includes an amplifier 61 and a band pass filter 66 to obtain a smoother waveform, as shown at 69 (FIG. 2), for determining the peak of the signal during a scan. A phase shift filter 68 compensates for shifting during band pass filter operation and to add 90° phase to the filtered signal to get to zero crossing point at the peak detected during a scan. A zero crossing detector 70 then identifies the peak point to be compared for phase variation with respect to the drive signal. Alternatively, digital processing of the raw output signal 62 would also be possible.

After processing, the sensor signal output is derived from logical decoder 72 that compared the phase between an initiated drive signal 74 and the output 62. Like the electrode output 62, the initiated drive signal 74 may also be processed, as shown diagrammatically at 76, in a manner compatible with the processing at processor 64. As a result of the comparison between the drive signal 74 and the electrode output 62, the logical decoder provides output 78 in the form of a voltage signal representative of the relative capacitance between the driver electrodes 24 and the output electrode 26, and thereby uniquely representative of the angular position of the throttle valve 12.

Preferably, the output 78 is provided as a pulse width modulated (PWM) signal compatible for introduction with other processing apparatus, for example, an engine control module, transmission control, steering control, or suspension controllers as shown at 80 in FIG. 1. Nevertheless, for the sake of compatibility with the processing employed with the previously known contact sensors, signal 78 is passed through a low pass filter 84 in order to provide an analog signal that replaces the signals received from previously known contact sensors for engine control or the like.

As an alternative, digital output data can be provided by feeding the initiating drive signal 74 into a ten bit binary counter with a clock signal for example, driven at 32 MHz. Preferably, the clock signal is also divided by 128 to provide a 250 kHz clock signal (eight times (SX) the scan frequency) to the logical driver 60 to synchronize all clocks. The ten bit binary counter provides a ten bit data signal to a ten bit latch input which also receives a latching input from the output of the zero crossing detector 70. As a result, the latch provides a ten bit data signal representing digital position data updated at 31.25 kHz rate (the scan frequency) to provide data to other processors or controls. However, while digital data may be useful for testing purposes, it is less likely to be incorporated in the motor vehicle because of the physical wiring required.

Figure 2:
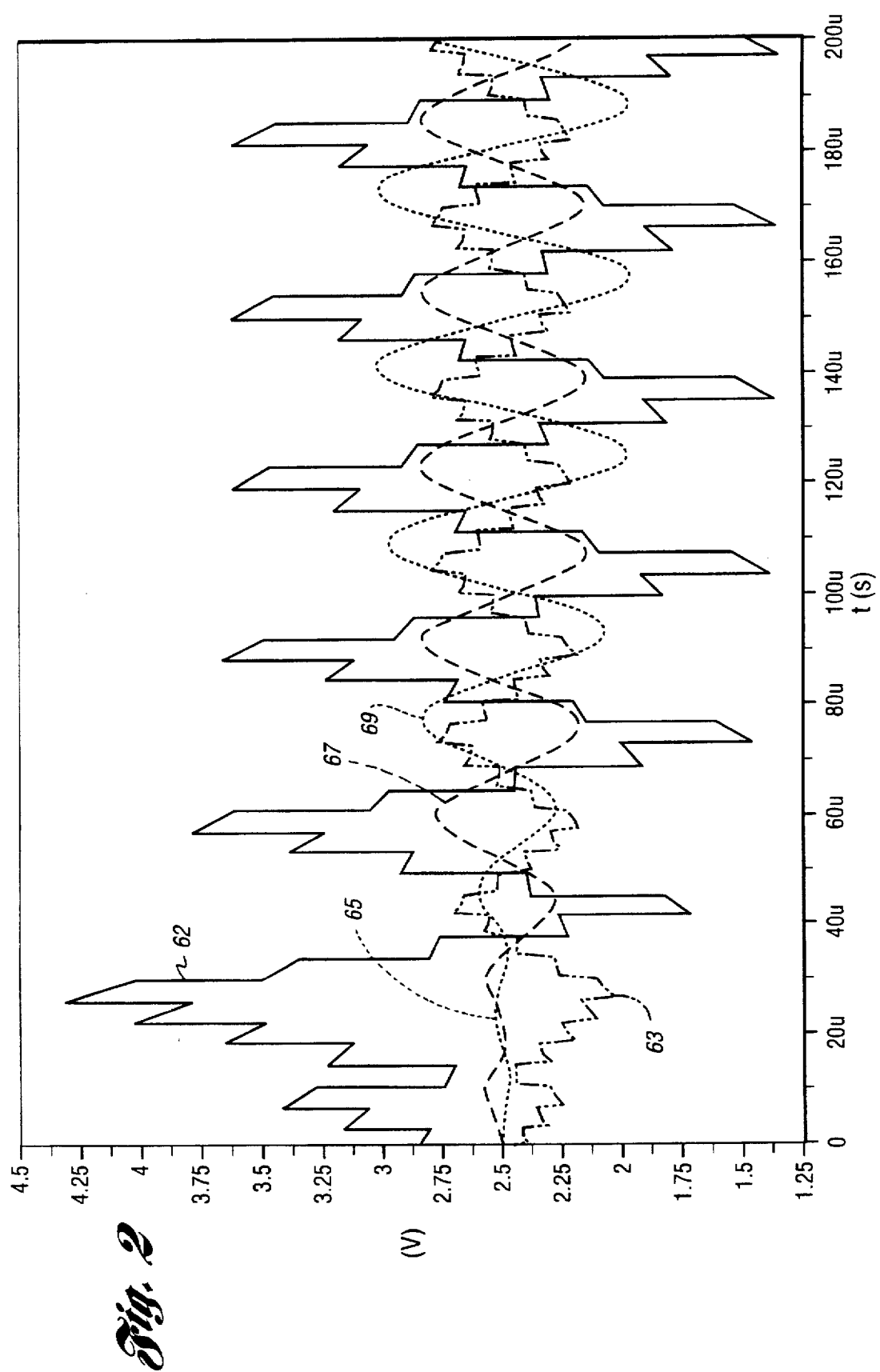
FIG. 2 is a graphic representation of representative signals throughout the circuit shown in FIG. 1.

As shown in FIG. 2, traces graphically represent the electrode output 62 and subsequent filter outputs that provide signal 69 whose phase is compared with similarly processed drive signal 74. Traces 65 and 67 represent intermediate signal transformations of a signal passing through preferred first and second stages of the band pass filter, that is preferably of the type that provides a negative overall gain. The signal 63 is a buffered version of output 62 passed through a high input impedance amplifier 61 with a low output impedance when the band pass filter 66 has an input impedance too low to work effectively on the signal 62 directly.

Referring now to FIG. 3, a modified sensor body 16 according to the present invention comprises a rotating member 18 and a coupler 20 similar to that shown in FIG. 1. A similar non-uniform dielectric material is carried on the rotatable member 18. However, a stationary disk 88 that carries the electrode board 24 having electrodes 28-40 also carries a concentric electrode ring 96 as shown at FIG. 4. Accordingly, a peripheral ring 90 on the rotatable member 18 maintains a consistent gap with the output electrode 96 associated with the rotatable member, while the non-uniform dielectric material registers only with the driver electrode board 24 including the electrodes 28–42. As a result, a sensor body 16 according to the present invention can have a reduced number of parts to be packaged in the vehicle.

A further alternative of this sensor body 16 is shown at 91 in FIGS. 5–7. In this embodiment, the driver electrode board includes at least one and preferably two redundant electrodes to be attached to each drive terminal 44–58. As shown in FIG. 6, each electrode illustrated as bearing like digits is coupled to a single drive terminal. Such an arrangement compensates for offsets and position tolerances between the rotatable member 18 and the driver electrode board 24. In addition, the embodiment 91 includes an output electrode including a plurality of electrode segments 94 dispersed between open, insulating or non-conducting segments 98.

As a result, the rotatable body 18 carries a conductor from the pickup, preferably in the form of a spring 100, to couple the output 62 to the signal processor 64. The spring is conveniently provided already in previously known sensors to position a rotatable member in the throttle closed position even when the mechanical indexing connection between the shaft tabs such as triangular tabs 95, and a rectangular shaft end 97, is damaged. This preferred sensor body construction employs only a single gap between the drive electrodes and the output.

Figure 8:
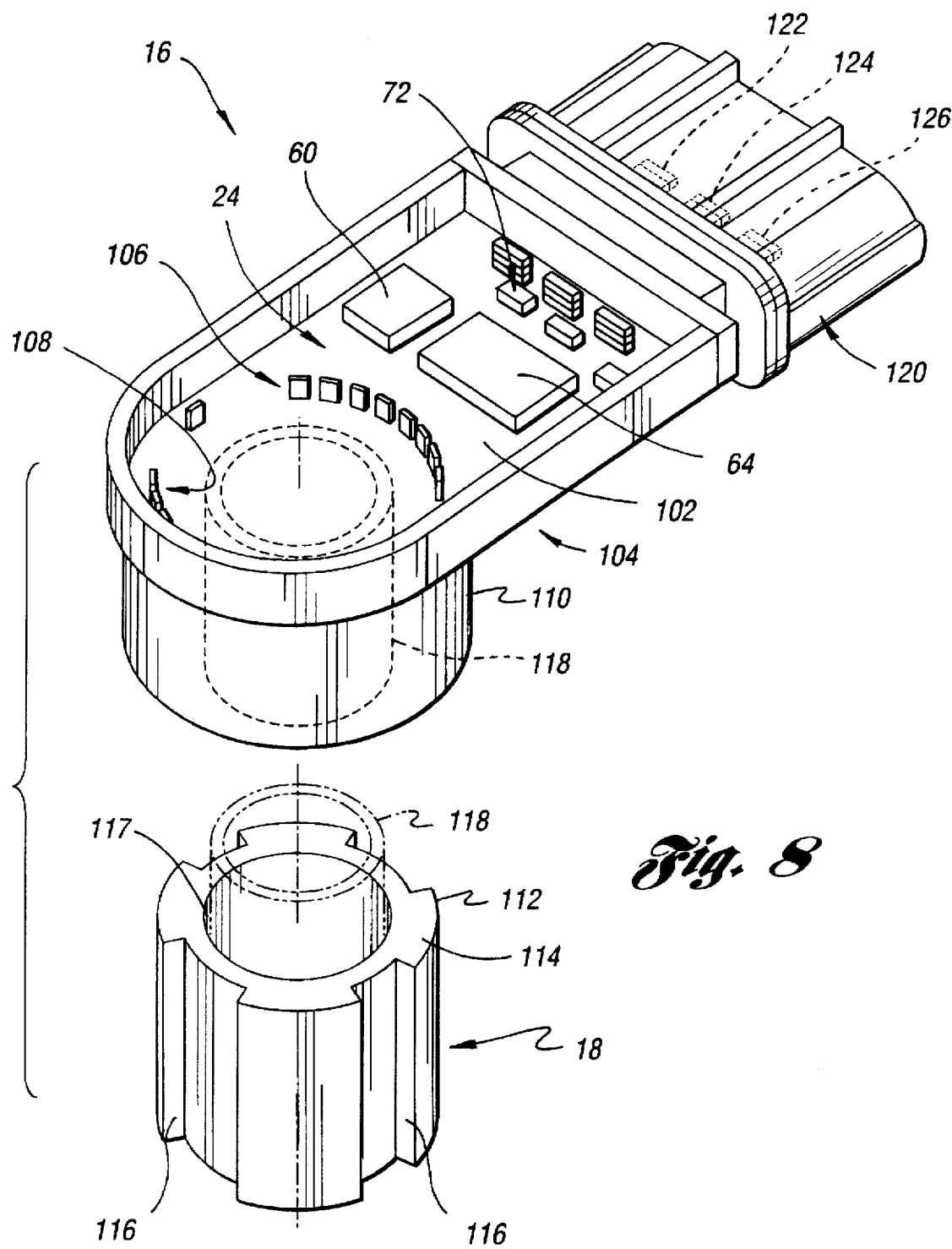
FIG. 8 is an exploded perspective view of further modified sensor arrangement constructed according to the present invention for use in the circuit as shown in FIG. 1.

Referring now to FIG. 8, a sensor body 16 according to the present invention is thereshown comprising a housing 102 that provides a radial gap between the driving electrodes and the output electrode. In particular, the driver electrode board 24 comprises a driver board 104 arranged with a first set 106 of eight driving electrodes extending along the periphery of the cylindrical housing portion 110 and a redundant set 108 of electrodes, preferably diametrically opposed to the set 106 to measure 180° movement. Other modifications of redundant alignments are possible depending upon the degree of movement that must be sensed. For example, three sets may be arranged symmetrically to sense movement in a 120° range, four sets for a 90° range etc.

A tubular rotor 112 is received in the cylindrical housing portion 110 and forms the rotary member 18. The tubular rotor 112 includes a non-uniform dielectric layer having radial protrusions 114 and recesses 116 to provide the non-uniform dielectric material on the rotary member 18. A radially inner output electrode 118 is coupled to the board 104 to connect the sensor body 16 to the processor circuit 64 and logical decoder 72 positioned on board 104. Accordingly, an additional air gap 117 between the electrode 118 and the rotary member 18 is introduced, but the radial orientation improves mechanical alignment of the sensor parts with respect to the axis of the shaft 22. An appropriate terminal coupling 120 provides an interface between sensor 16 and other automotive controls for desired functions, and preferably includes conventional terminals such as power terminal 122, ground terminal 124, and signal terminal 126.

As a result, the present invention provides a non-contact sensor having an output representative of throttle valve position by relative changes in capacitance. The invention reduces the complexity and expense of previously known non-contact sensors, and avoids the mechanical difficulties previously encountered with previously known contact sensors. Moreover, while the output of the sensor is compatible with existing motor vehicle controls, the output may be adapted in several manners to enhance operational processing or improve vehicle functions controlled by other logical processors.

In the above described present invention, many modifications will become apparent to those skilled in the art to which it pertains without departing from the scope or spirit of the present invention. For example, although the preferred embodiments have disclosed sets of eight electrodes, as a number of electrodes matching the numbers corresponding to the powers of two are preferred feature for compatibility with logical drive circuits, it is to be understood that any number of electrode segments numbering greater than three will provide positioning data when associated with a non-uniform dielectric having at least one change of conductivity dimension that varies the gap, preferably, a large step to improve contrast in capacitance readings between the driver electrode board and the output electrode as a function of throttle resistant.

What is claimed is:

1. A throttle position sensor comprising:

a driver electrode board including a plurality of electrodes;

a rotating member with a coupler for rotational movement with the throttle shaft;

an intermediate dielectric having a spatially non-uniform, conductive dimension between said driver board and said rotating member;

an output electrode associated with said rotating member for delivering output passed through said intermediate dielectric from said driver board electrodes;

a logical driver for inputting an electrical charge to a selected set of said plurality of electrodes;

a signal processor for generating a phase responsive signal; and a logical decoder for comparing the phase difference between said input charge and said phase responsive signal and generating a sensor output representing throttle angular position independent of absolute capacitance between said electrodes, wherein said driver board and said output electrodes are on a single body.

2. The invention as defined in claim 1 wherein said rotating member includes said intermediate dielectric.

3. The invention as defined in claim 2 wherein said driver electrode board is concentric with said output electrode.

4. The invention as defined in claim 1 wherein said signal processor comprises a zero-crossing detector.

5. The invention as defined in claim 1 wherein said signal processor includes a bandpass filter intermediate said output electrode and said zero-crossing detector.

6. The invention as defined in claim 1 wherein said selected set is a sequentially incremented set of adjacent electrodes.

7. The invention as defined in claim 1 wherein said selected set is a plurality of spaced apart, uniformly charged electrodes.

8. The invention as defined in claim 1 wherein said logical decoder sensor output is a pulse width modulated signal.

9. The invention as defined in claim 8 wherein said sensor further comprises a low pass filter receiving said pulse width modulated signal to generate an analog sensor output signal.

10. A capacitive throttle position sensor for attachment to a throttle shaft comprising:

a driver electrode board including a plurality of radially aligned electrodes concentrically arranged about said throttle shaft on said driver electrode board;

a tubular electrode adapted to concentrically receive the throttle shaft; and an intermediate dielectric having a radially non-uniform, dielectric strength concentrically carried about said tubular electrode.

11. The invention as defined in claim 10 wherein said driver electrode board includes a logical driver circuit for inputting an electrical charge to a selected set of said plurality of electrodes.

12. The invention as defined in claim 10 wherein said driver electrode board includes a signal processor for generating a phase responsive signal.

13. The invention as defined in claim 11 wherein said driver electrode board includes a logical decoder for comparing the phase difference between an input charge to said plurality of electrodes and said phase responsive signal and generating a sensor output representing throttle angular position independent of absolute capacitive between said plurality of electrodes and said tubular electrode.

14. A capacitive throttle position sensor comprising:
   a driver electrode board disc including a plurality of electrodes radially aligned on the disc from a point and a conductor ring concentric to said radially aligned electrodes with respect to said point;
   a rotating member with a coupler for rotational movement with a throttle shaft, said rotational member having a plurality of conductive areas separated by a plurality of nonconductive areas; and
   an output electrode coupled to said concentric conductor ring.

15. The invention as defined in claim 14 wherein said output electrode comprises a coil spring.

16. The invention as defined in claim 15 wherein said coil spring is concentrically carried by said coupler.

17. The invention as defined in claim 14 wherein said driver electrode board includes a first set of electrodes and at least one redundant set of radially aligned electrodes to reduce sensitivity to mechanical misalignment.

* * * * *